(12) United States Patent
Zhu

(10) Patent No.: US 11,864,205 B2
(45) Date of Patent: *Jan. 2, 2024

(54) SCHEDULING METHOD, BASE STATION, TERMINAL AND STORAGE MEDIUM

(71) Applicant: Beijing Xiaomi Mobile Software Co., Ltd., Beijing (CN)

(72) Inventor: Yajun Zhu, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/064,448

(22) Filed: Dec. 12, 2022

(65) Prior Publication Data
US 2023/0108032 A1 Apr. 6, 2023

Related U.S. Application Data

(63) Continuation of application No. 16/955,612, filed as application No. PCT/CN2017/119031 on Dec. 27, 2017, now Pat. No. 11,595,984.

(51) Int. Cl.
*H04W 72/23* (2023.01)
*H04W 72/0446* (2023.01)
*H04W 72/1263* (2023.01)

(52) U.S. Cl.
CPC ....... *H04W 72/23* (2023.01); *H04W 72/0446* (2013.01); *H04W 72/1263* (2013.01)

(58) Field of Classification Search
CPC ........... H04W 72/0413; H04W 72/044; H04W 76/10; H04W 72/1289; H04W 72/0493; H04L 5/0053; H04L 5/00
See application file for complete search history.

(56) References Cited

U.S. PATENT DOCUMENTS 10,736,129 B2 * 8/2020 Park ............... H04L 5/0082
2010/0322135 A1 12/2010 Van Lieshout et al.
(Continued)

FOREIGN PATENT DOCUMENTS

CN 101730234 A 6/2010
CN 102036398 A 4/2011
(Continued)

OTHER PUBLICATIONS

International Search Report of PCT Application No. PCT/CN2017/119031 dated Sep. 29, 2018.
(Continued)

*Primary Examiner* — Iqbal Zaidi
(74) *Attorney, Agent, or Firm* — Finnegan, Henderson, Farabow, Garrett & Dunner, L.L.P.

(57) ABSTRACT

A scheduling method, performed by a base station, includes determining scheduled transmission units according to a scheduling rule, wherein the scheduling rule is configured to specify that in case that a plurality of transmission units that are continuous in a time domain have been scheduled, a remaining plurality of transmission units are scheduled when the remaining plurality of transmission units are discontinuous in the time domain, which is caused by occupied transmission units existing in the plurality of transmission units that are continuous in the time domain, wherein a terminal is configured to determine the scheduled transmission units according to the scheduling rule.

15 Claims, 5 Drawing Sheets

(56) References Cited

U.S. PATENT DOCUMENTS

| | | | |
|---|---|---|---|
| 2012/0127938 A1 | 5/2012 | Lv et al. | |
| 2015/0264662 A1 | 9/2015 | Sahlin et al. | |
| 2016/0345355 A1 | 11/2016 | Andersson et al. | |
| 2018/0049244 A1* | 2/2018 | Lee | H04W 76/27 |
| 2020/0073734 A1 | 3/2020 | Wang | |
| 2020/0229226 A1* | 7/2020 | Wang | H04W 52/0229 |
| 2020/0259531 A1 | 8/2020 | Zhu | |

FOREIGN PATENT DOCUMENTS

| | | |
|---|---|---|
| CN | 104885548 A | 9/2015 |
| CN | 105992373 A | 10/2016 |
| CN | 106304380 A | 1/2017 |
| CN | 106455103 A | 2/2017 |
| CN | 107006003 A | 8/2017 |
| EP | 3 116 281 A1 | 1/2017 |

OTHER PUBLICATIONS

Motorola, Downlink Control Signalling for TDD, 3GPP TSG RAN1 #52, R1-080726, Sorrento, Italy, Feb. 11-15, 2008, 3 pages.

Extended European Search Report of counterpart EP application No. 17936473.2 dated Nov. 18, 2020.

First Office Action of Chinese Application No. 201780002214.4 dated Feb. 3, 2021.

Examination Report of Indian Application No. 202027028247 dated Aug. 13, 2021.

Second Office Action of Chinese Application No. 201780002214.4 dated Aug. 17, 2021.

Communication pursuant to Article 94(3) EPC of European Application No. 17936473.2 dated Jun. 30, 2022, 5 pages.

\* cited by examiner

SCHEDULING METHOD, BASE STATION, TERMINAL AND STORAGE MEDIUM

CROSS REFERENCE TO RELATED APPLICATIONS

The present disclosure claims the benefit of and is a continuation of U.S. application Ser. No. 16/955,612, filed Jun. 18, 2020, which is a national phase application based on PCT/CN2017/119031, filed Dec. 27, 2017, both of which are incorporated herein by reference in their entireties.

TECHNICAL FIELD

The present disclosure relates to the field of communication technology, and more particularly to a scheduling method, a base station, a terminal, and a storage medium.

BACKGROUND

In the communication system, data transmission between a base station and a terminal is implemented based on the scheduling of the base station. The base station transmits a scheduling signaling to the terminal, wherein the scheduling signaling is used for indicating a location of a scheduled transmission unit. The terminal receives the scheduling signaling, so as to determine the location of the transmission unit according to the scheduling signaling. Then, the base station exchanges data with the terminal through the scheduled transmission unit.

Generally, one scheduling signal only indicates the location of one transmission unit. However, communication systems are constantly evolving with the continuous emergence of new Internet applications. Accordingly, the current communication systems provide a plurality of service types, such as eMBB (Enhanced Mobile Broad Band). URLLC (Ultra Reliable Low Latency Communication), mMTC (massive Machine Type Communication), and the like. Considering that different service types have different requirements for the communication system, a more flexible scheduling method is proposed, which may transmit a scheduling signaling in any symbol in a slot, wherein there are a plurality of continuous symbols in a time domain in one slot, and the scheduling signaling is used for indicating that the plurality of symbols that are continuous in the time domain serve as transmission units to be scheduled.

SUMMARY

According to a first aspect of embodiments of the present disclosure, a scheduling method is provided. The method is applied to a base station, and includes:

transmitting a scheduling signaling to a terminal, wherein the scheduling signaling includes indication information for indicating a plurality of transmission units that are discontinuous in a time domain, and the terminal is configured to receive the scheduling signaling and determine the plurality of transmission units that are discontinuous in the time domain according to the indication information; and exchanging data with the terminal through the plurality of transmission units.

According to a second aspect of embodiments of the present disclosure, a scheduling method is provided. The method is applied to a terminal, and includes:

receiving a scheduling signaling transmitted by a base station, wherein the scheduling signaling includes indication information for indicating a plurality of transmission units that are discontinuous in a time domain;

determining the plurality of transmission units that are discontinuous in the time domain according to the indication information; and exchanging data with the base station through the plurality of transmission units.

According to a third aspect of embodiments of the present disclosure, a base station is provided. The base station includes:

a processor; and a memory, which is configured to store processor-executable instructions;

wherein the processor is configured to:

transmit a scheduling signaling to a terminal, wherein the scheduling signaling includes indication information for indicating a plurality of transmission units that are discontinuous in a time domain, and the terminal is configured to receive the scheduling signaling and determine the plurality of transmission units that are discontinuous in the time domain according to the indication information; and exchange data with the terminal through the plurality of transmission units.

According to a fourth aspect of embodiments of the present disclosure, a terminal is provided. The terminal includes:

a processor; and a memory, which is configured to store processor-executable instructions;

wherein the processor is configured to:

receive a scheduling signaling transmitted by a base station, wherein the scheduling signaling includes indication information for indicating a plurality of transmission units that are discontinuous in a time domain;

determine the plurality of transmission units that are discontinuous in the time domain according to the indication information; and exchange data with the base station through the plurality of transmission units.

It is to be understood that both the foregoing general description and the following detailed description are exemplary only and are not intended to limit the present disclosure.

BRIEF DESCRIPTION OF THE DRAWINGS

The accompanying drawings, which are incorporated in and constitute a part of this specification, illustrate embodiments consistent with the present disclosure, and together with the description, serve to explain the principles of the present disclosure.

DETAILED DESCRIPTION

In order to make the objective, the technical solution and the advantages of the present disclosure apparent, the present disclosure will be described in detail with reference to accompanying drawings and embodiments. Here, exemplary embodiments of the present disclosure and the description thereof are used to explain the present disclosure, but are not intended to limit the present disclosure.

Embodiments of the present disclosure provide a scheduling method, a base station, a terminal, and a storage medium. The present disclosure will be described in detail below with reference to accompanying drawings.

Figure 1:
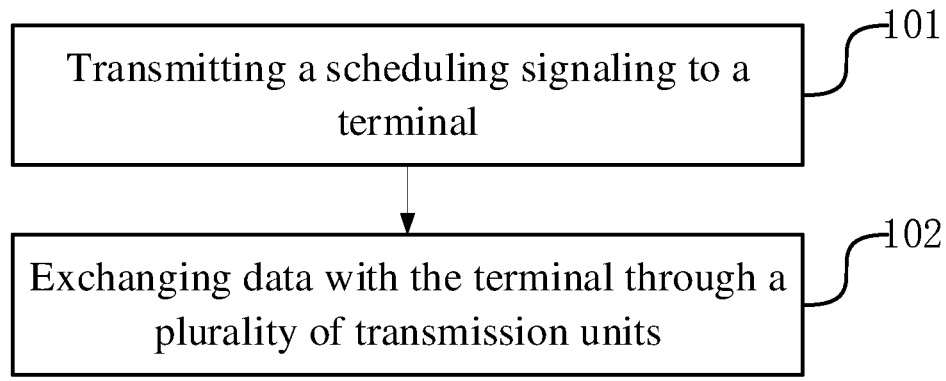
FIG. 1 is a flowchart of a scheduling method according to an exemplary embodiment.

FIG. 1 is a flowchart of a scheduling method applied to a base station, according to an exemplary embodiment. As shown in FIG. 1, the method includes the following steps.

In step 101, the base station transmits a scheduling signaling to a terminal, wherein the scheduling signaling includes indication information for indicating a plurality of transmission units that are discontinuous in a time domain, and the terminal is configured to receive the scheduling signaling and determine the plurality of transmission units that are discontinuous in the time domain according to the indication information.

In step 102, the base station exchanges data with the terminal through the plurality of transmission units.

According to the method provided in the embodiment of the present disclosure, the base station transmits the scheduling signaling to the terminal, wherein the scheduling signaling includes indication information for indicating the plurality of transmission units that are discontinuous in the time domain; the terminal receives the scheduling signaling and determines the scheduled plurality of transmission units that are discontinuous in the time domain according to the indication information; and the base station may exchange data with the terminal through the scheduled plurality of transmission units. Embodiments of the present disclosure provide a method for scheduling a plurality of transmission units that are discontinuous in the time domain, thereby breaking the limitation that only the plurality of transmission units that are continuous in the time domain can be scheduled, which improves flexibility, effectively supports a plurality of service types, and expands the service scope.

In a possible implementation, the indication information includes location information of the plurality of transmission units that are discontinuous in the time domain;

the location information of the transmission units includes start locations and end locations of the transmission units; or the location information of the transmission units includes start locations and continuation lengths of the transmission units, and end locations of the transmission units are determined by the start locations and the continuation lengths of the transmission units.

By carrying the location information of the plurality of transmission units that are discontinuous in the time domain in the scheduling signaling, the scheduled transmission units may be intuitively and accurately indicated.

In another possible implementation, the method further includes:

transmitting a transmission unit index table to the terminal, wherein the transmission unit index table includes location information of the plurality of transmission units that are discontinuous in the time domain corresponding to each index identifier; and the indication information is the index identifier, and the terminal is configured to receive the scheduling signaling, query the transmission unit index table according to the index identifier, and determine the location information of the plurality of transmission units that are discontinuous in the time domain corresponding to the index identifier.

The base station first transmits the transmission unit index table to the terminal, then the scheduling signaling transmitted by the base station to the terminal only needs to carry index identifier during each scheduling is carried out, without carrying the location information of the plurality of transmission units, and the location information of the plurality of transmission units can be obtained by querying the transmission unit index table. Accordingly, the data volume is reduced and the network resources are saved.

In another possible implementation, the method further includes:

transmitting a transmission unit index table to a terminal, wherein the transmission unit index table includes a transmission unit configuration corresponding to each index identifier, the transmission unit configuration includes a scheduling identifier for each transmission unit, the scheduling identifier is a first identifier indicating that a corresponding transmission unit is scheduled, or the scheduling identifier is a second identifier indicating that a corresponding transmission unit is not scheduled; and the indication information is the index identifier, and the terminal is configured to receive the scheduling signaling, query the transmission unit index table according to the index identifier, determine a transmission unit configuration corresponding to the index identifier, and determine transmission units for which the scheduling identifier is the first identifier in the transmission unit configuration as scheduled transmission units.

The base station first transmits the transmission unit index table to the terminal, then the scheduling signaling transmitted by the base station to the terminal only needs to carry index identifier during the scheduling is carried out each time, without carrying the transmission unit configuration, and the transmission unit configuration can be obtained by querying the transmission unit index table. Accordingly, the data volume is reduced and the network resources are saved.

In another possible implementation, the indication information is positioned in an information field at a fixed location of the scheduling signaling, and a bit length of the indication information is fixed or determined by configuration.

In another possible implementation, the method further includes:

determining scheduled transmission units according to a scheduling rule; wherein the scheduling rule is configured to specify that in case that a plurality of transmission units that are continuous in a time domain have been scheduled, remaining plurality of transmission units are scheduled when the remaining plurality of transmission units are discontinuous in the time domain caused by occupied transmission units existing in the plurality of transmission units that are continuous in the time domain, and the terminal is configured to determine the scheduled transmission units according to the scheduling rule.

By predefining the scheduling rule, it is possible to instruct the scheduling of the remaining transmission units in case that the plurality of transmission units that are continuous in the time domain have been scheduled but some transmission units are occupied. Accordingly, it not only provides a method for scheduling the plurality of transmission units that are discontinuous in the time domain, but also avoids the waste of the transmission units.

Figure 2:
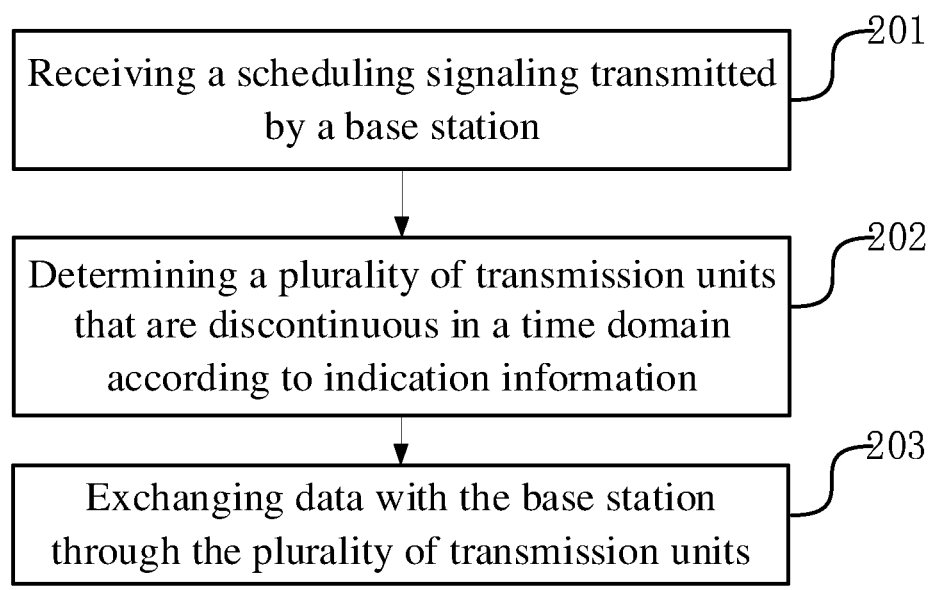
FIG. 2 is a flowchart of a scheduling method according to an exemplary embodiment.

FIG. 2 is a flowchart of a scheduling method applied to a terminal, according to an exemplary embodiment. As shown in FIG. 2, the method includes the following steps.

In step 201, the terminal receives a scheduling signaling transmitted by a base station, wherein the scheduling signaling includes indication information for indicating a plurality of transmission units that are discontinuous in a time domain.

In step 202, the terminal determines the plurality of transmission units that are discontinuous in the time domain according to the indication information.

In step 203, the terminal exchanges data with the base station through the plurality of transmission units.

According to the method provided in the embodiment of the present disclosure, the terminal receives the scheduling signaling transmitted by the base station, wherein the scheduling signaling includes indication information for indicating the plurality of transmission units that are discontinuous in the time domain; the terminal determines the scheduled plurality of transmission units that are discontinuous in the time domain according to the indication information; and the terminal may exchange data with the base station through the plurality of transmission units. Embodiments of the present disclosure provide a method for scheduling a plurality of transmission units that are discontinuous in the time domain, thereby breaking the limitation that only the plurality of transmission units that are continuous in the time domain can be scheduled, which improves flexibility, effectively supports a plurality of service types, and expands the service scope.

In a possible implementation, the indication information includes location information of the plurality of transmission units that are discontinuous in the time domain;

the location information of the transmission units includes start locations and end locations of the transmission units; or the location information of the transmission units includes start locations and continuation lengths of the transmission units, and end locations of the transmission units are determined by the start locations and the continuation lengths of the transmission units.

By carrying the location information of the plurality of transmission units that are discontinuous in the time domain in the scheduling signaling, the scheduled transmission units may be intuitively and accurately indicated, and the terminal may directly determine the scheduled transmission units according to the location information carried in the scheduling signaling.

In another possible implementation, the indication information is an index identifier, and the determining the plurality of transmission units that are discontinuous in the time domain according to the indication information includes:

querying a transmission unit index table according to the index identifier, and determining location information of the plurality of transmission units that are discontinuous in the time domain corresponding to the index identifier, wherein the transmission unit index table includes the location information of the plurality of transmission units that are discontinuous in the time domain corresponding to each index identifier.

By setting the transmission unit index table, the scheduling signaling transmitted by the base station to the terminal only needs to carry index identifier during each scheduling is carried out, without carrying the location information of the plurality of transmission units, and the location information of the plurality of transmission units can be obtained by querying the transmission unit index table. Accordingly, the data volume is reduced and the network resources are saved.

In another possible implementation, the indication information is an index identifier, and the determining the plurality of transmission units that are discontinuous in the time domain according to the indication information includes:

querying a transmission unit index table according to the index identifier, determining a transmission unit configuration corresponding to the index identifier, and determining transmission units that a scheduling identifier is a first identifier in the transmission unit configuration as scheduled transmission units, wherein the transmission unit index table includes the transmission unit configuration corresponding to each index identifier, the transmission unit configuration includes the scheduling identifier for each transmission unit, the scheduling identifier is the first identifier indicating that a corresponding transmission unit is scheduled, or the scheduling identifier is a second identifier indicating that a corresponding transmission unit is not scheduled.

By setting the transmission unit index table, during each scheduling, the scheduling signaling transmitted by the base station to the terminal only needs to carry index identifier during the scheduling is carried out each time, without carrying the transmission unit configuration, and the transmission unit configuration can be obtained by querying the transmission unit index table. Accordingly, the data volume is reduced and the network resources are saved.

In another possible implementation, the indication information is positioned in an information field at a fixed location of the scheduling signaling, and a bit length of the indication information is fixed or determined by a configuration.

In another possible implementation, the method further includes:

determining scheduled transmission units according to a scheduling rule; wherein the scheduling rule is configured to specify that in case that a plurality of transmission units that are continuous in a time domain have been scheduled, remaining plurality of transmission units are scheduled when the remaining plurality of transmission units are discontinuous in the time domain caused by occupied transmission units existing in the plurality of transmission units that are continuous in the time domain, and the base station is configured to determine the scheduled transmission units according to the scheduling rule.

By predefining the scheduling rule, it is possible to instruct the scheduling of the remaining transmission units in case that the plurality of transmission units that are continuous in the time domain have been scheduled but some transmission units are occupied. Accordingly, it not only provides a method for scheduling the plurality of transmission units that are discontinuous in the time domain, but also avoids the waste of the transmission units.

Figure 3:
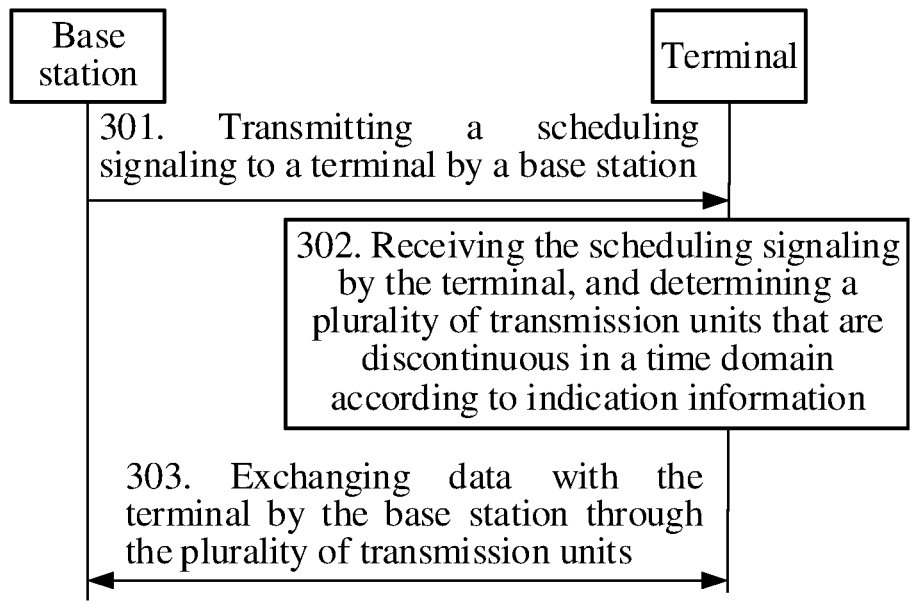
FIG. 3 is a flowchart of a scheduling method according to an exemplary embodiment.

FIG. 3 is a flowchart of a scheduling method according to an exemplary embodiment. A base station and a terminal serve as an interactive subject. As shown in FIG. 3, the method includes the following steps.

In step 301, the base station transmits a scheduling signaling to the terminal, wherein the scheduling signaling includes indication information for indicating a plurality of transmission units that are discontinuous in a time domain.

Among them, the scheduling signaling is a signaling for determining scheduled transmission units, such as DCI (Downlink Control Information) or other signaling.

The transmission units are a resource set for carrying data transmission in a frequency domain, sch as one or more REs (Resource Element), or one or more RBs (Resource Block), or other types of frequency domain units. The transmission units are a resource set for carrying data transmission in the time domain, such as symbols, slots, subframes, or radio frames, or other types of time domain units.

The scheduling signaling may schedule one or more data packets, that is, the plurality of transmission units scheduled by the scheduling signaling may carry the data transmission for one data packet, or may carry the data transmission for a plurality of data packets.

In a possible implementation, the indication information is added in an information field at a fixed location of the scheduling signaling. The terminal may obtain the indication information from the information field at the fixed location in the scheduling signaling when receiving the scheduling signaling. Moreover, a bit length of the indication information may be fixed or determined by configuration.

In the embodiment of the present disclosure, the indication information may include location information of the plurality of transmission units that are discontinuous in the time domain, and the locations of the plurality of transmission units that are discontinuous in the time domain may be determined according to the indication information, so that these discontinuous transmission units in the time domain are determined as the transmission units to be scheduled.

Figure 4:
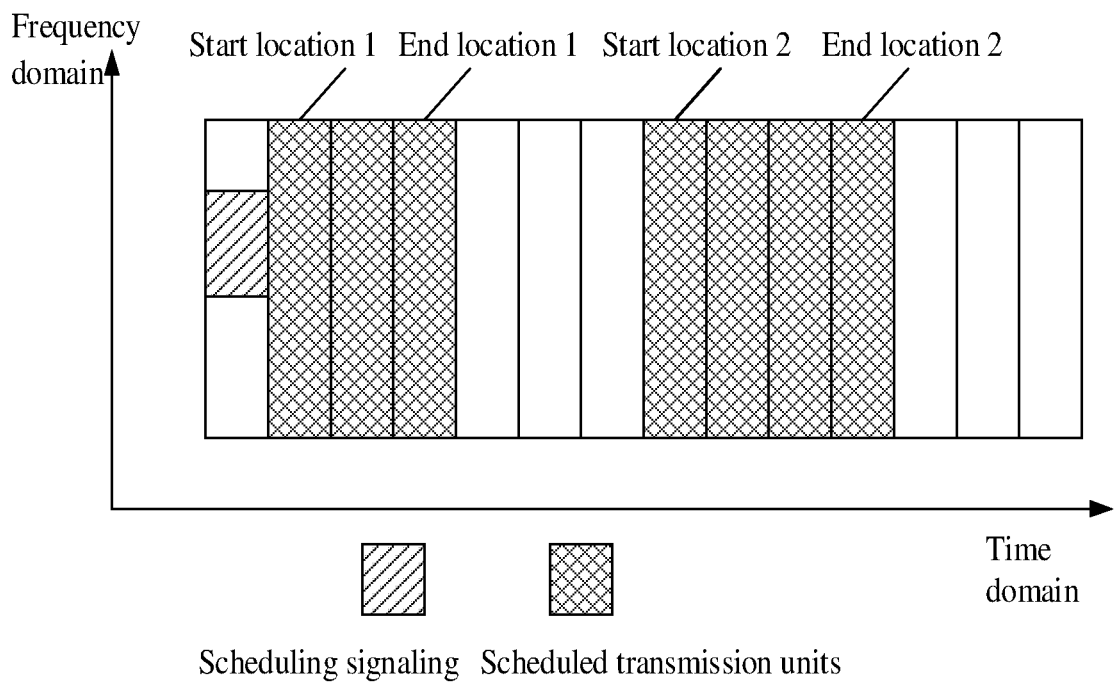
FIG. 4 is a schematic diagram of one slot according to an exemplary embodiment.

In a first possible implementation, the location information of the transmission units includes start locations and end locations of the transmission units, that is, the indication information includes a start location and an end location of each transmission unit in the plurality of transmission units that are discontinuous in the time domain. FIG. 4 is a schematic diagram of one slot according to an exemplary embodiment. With reference to FIG. 4, one slot includes a plurality of symbols, and a scheduling signaling DCI is transmitted on the first symbol in the slot. The indication information is (start location 1, end location 1). (start location 2, end location 2), and the two discontinuous transmission units in the time domain indicated by the indication information are shown in FIG. 4.

In a second possible implementation, the location information of the transmission unit includes start locations and continuation lengths of the transmission units, and end locations of the transmission units are determined by the start locations and the continuation lengths of the transmission units. That is, the indication information includes a start location and a continuation length of each transmission unit in the plurality of transmission units that are discontinuous in the time domain. With reference to FIG. 4, if the indication information is {start location 1, continuation length=3 symbols}, {start location 2, continuation length=4 symbols}, the two discontinuous transmission units in the time domain indicated by the indication information are shown in FIG. 4.

In step 302, the terminal receives a scheduling signaling, and determines the plurality of transmission units that are discontinuous in the time domain according to the indication information.

If the instruction information includes the start location and the end location of each transmission unit in the plurality of transmission units that are discontinuous in the time domain, a location of each transmission unit is determined according to the start location and the end location of each transmission unit, and further locations of the plurality of transmission units are determined.

If the indication information includes the start location and the continuation length of each transmission unit in the plurality of transmission units that are discontinuous in the time domain, the end location of each transmission unit is determined according to the start location and the continuation length location of each transmission unit. Accordingly, the location of each transmission unit may be determined according to the start location and the end location of each transmission unit, and further the locations of the plurality of transmission units may be determined.

In step 303, the base station exchanges data with the terminal through the plurality of transmission units.

The determined plurality of transmission units are the transmission units used when the base station exchanges data with the terminal. In a downlink process, the base station transmits data through the plurality of transmission units, the terminal receives data through the plurality of transmission units. In an uplink process, the terminal transmits data through the plurality of transmission units, the base station receives data through the plurality of transmission units.

It should be noted that these embodiments only describe a process for scheduling the plurality of transmission units that are discontinuous in the time domain. In practical applications, the plurality of transmission units that are continuous in the time domain may further be scheduled. Moreover, the scheduling rule may be set. The scheduling rule is used to specify that in case that the plurality of transmission units that are continuous in the time domain have been scheduled, remaining plurality of transmission units are scheduled when the remaining plurality of transmission units are discontinuous in the time domain caused by occupied transmission units existing in the plurality of transmission units that are continuous in the time domain. Moreover, in a data exchanging process, the base station and the terminal determine the transmission unit to be scheduled according to the scheduling rule, that is, in a case where the plurality of transmission units that are continuous in the time domain have been scheduled, when occupied transmission units exist in the plurality of transmission units that are continuous in the time domain, resulting that the remaining plurality of transmission units are discontinuous in the time domain, the base station exchanges the data with the terminal through the remaining plurality of transmission units.

For example, when the base station has scheduled three continuous transmission units in the time domain: a transmission unit 1, a transmission unit 2 and a transmission unit 3, but the transmission unit 2 is occupied, the terminal may transmit the data through the transmission unit 1 and the transmission unit 3 according to the scheduling rule; and the base station may receive the data through the transmission unit 1 and the transmission unit 3 according to the scheduling rule.

In practical applications, the scheduling rule may be predefined in a communication protocol between the base station and the terminal, or may be transmitted to the terminal by the base station through an RRC signaling, a MAC CE, or a physical layer signaling.

According to the method provided by the embodiments of the present disclosure, the base station transmits a scheduling signaling to the terminal, wherein the scheduling signaling includes the indication information for indicating the plurality of transmission units that are discontinuous in the time domain; the terminal receives the scheduling signaling and determines the scheduled plurality of transmission units that are discontinuous in the time domain according to the indication information; and the base station may exchange data with the terminal through the plurality of transmission units. Embodiments of the present disclosure provide a method for scheduling a plurality of transmission units that are discontinuous in the time domain, thereby breaking the limitation that only the plurality of transmission units that are continuous in the time domain can be scheduled, which improves flexibility, effectively supports a plurality of service types, and expands the service scope.

Moreover, by predefining the scheduling rule, it is possible to instruct the scheduling of the remaining transmission units in case that the plurality of transmission units that are continuous in the time domain have been scheduled but some transmission units are occupied. Accordingly, it not only provides a method for scheduling the plurality of transmission units that are discontinuous in the time domain, but also avoids the waste of the transmission units.

Figure 5:
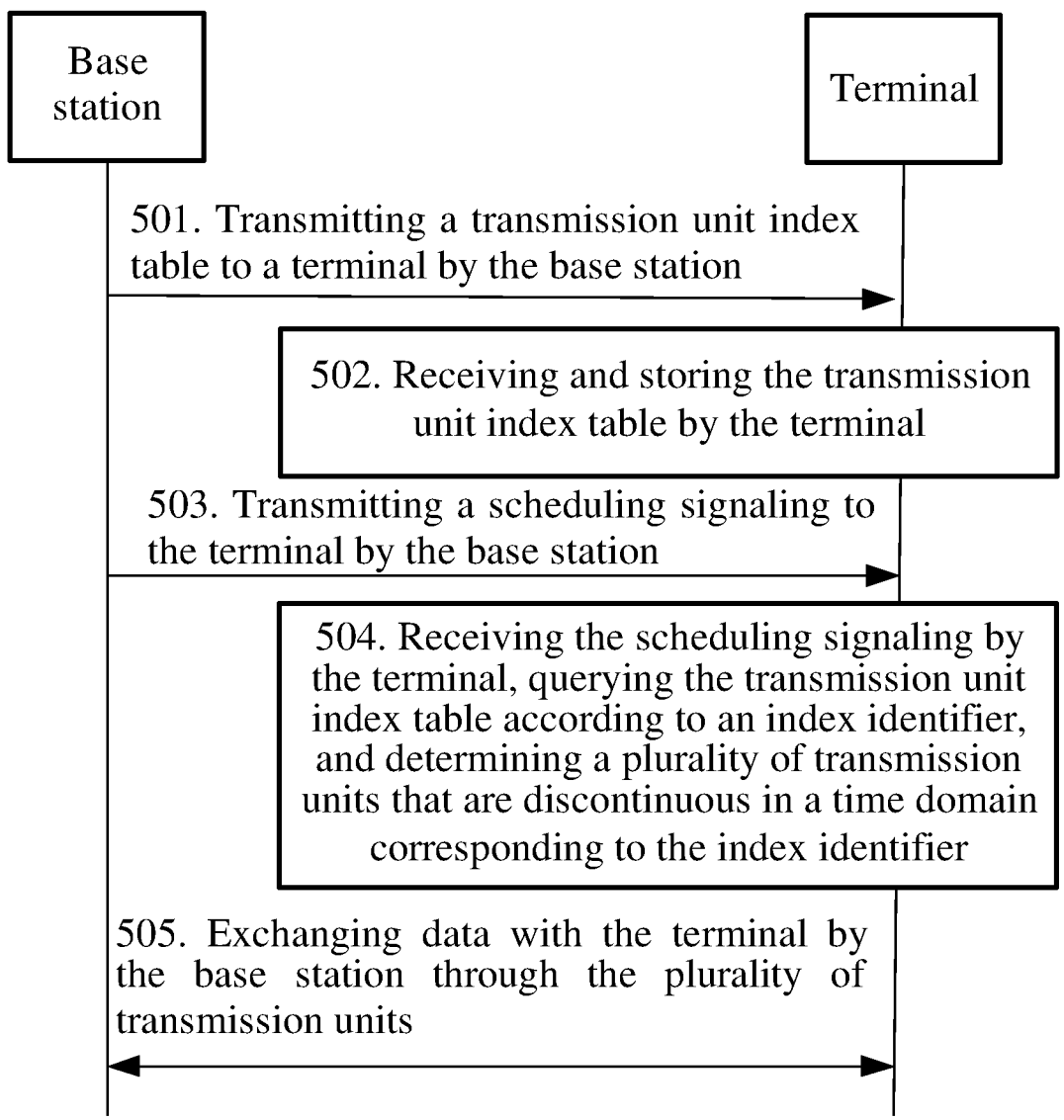
FIG. 5 is a flowchart of a scheduling method according to an exemplary embodiment.

FIG. 5 is a flowchart of a scheduling method according to an exemplary embodiment. A base station and a terminal serve as an interactive subject. As shown in FIG. 5, the method includes the following steps.

In step 501, the base station transmits a transmission unit index table to the terminal.

The transmission unit index table includes a plurality of transmission units that are discontinuous in a time domain corresponding to each index identifier.

In a first possible implementation, the transmission unit index table includes location information of the plurality of transmission units that are discontinuous in the time domain corresponding to each index identifier, and the location information may include start locations and end locations, or include start locations and continuation lengths. The location information of the plurality of corresponding transmission units may be determined according to the transmission unit index table provided that the index identifier of this scheduling is determined.

For example, the transmission unit index table may be shown in Table 1 below.

TABLE 1

| Index Identifier | Transmission Unit |
|---|---|
| 1 | {start location 1, continuation length 1}; {start location 2, continuation length 2} |
| 2 | {start location 1, continuation length 1}; (stall location 2, continuation length 2}; {start location 3, continuation length 3} |
| 3 | {start location 1, continuation length 1}; {start location 2, continuation length 2}; {start location 3, continuation length 3}; {start location 4, continuation length 4} |

In a second possible implementation, the transmission unit index table includes a transmission unit configuration corresponding to each index identifier, the transmission unit configuration includes a scheduling identifier for each transmission unit, the scheduling identifier is a first identifier indicating a corresponding transmission unit is scheduled, and the scheduling identifier is the second identifier indicating that a corresponding transmission unit is not scheduled. The corresponding transmission unit configuration may be determined according to the transmission unit index table provided that the index identifier of this scheduling is determined, and further it is determined that which transmission units are scheduled. Among them, the first identifier is different from the second identifier, for example, the first identifier is 1 and the second identifier is 0.

For example, the transmission unit index table may be as shown in Table 2 below. There are 14 symbols in one slot, a scheduling identifier 1 corresponding to one symbol indicates that the symbol is scheduled, and a scheduling identifier 0 corresponding to one symbol indicates the symbol is not scheduled.

TABLE 2

| Index Identifier | Transmission Unit Configuration |
|---|---|
| 1 | {11111111111111} |
| 2 | (11110001111000} |
| 3 | {11100001110000} |
| 4 | {11100001110011} |

The base station may transmit the transmission unit index table through a plurality of methods, such as an RRC (Radio Resource Control) signaling, a MAC (Media Access Control), a CE (Control Element), or a physical layer signaling.

In step 502, the terminal receives and stores the transmission unit index table.

It should be noted that the embodiment of the present disclosure is exemplified only by transmitting the transmission unit index table to the terminal by the base station. In fact, the above steps 501 and 502 are optional steps. In another embodiment, the transmission unit index table may be predefined in a communication protocol between the base station and the terminal, without being transmitted to the terminal by the base station.

In step 503, the base station transmits a scheduling signaling to the terminal, wherein the scheduling signaling includes indication information for indicating the plurality of transmission units that are discontinuous in the time domain, and the indication information is an index identifier.

When the base station carries out scheduling, the scheduling signaling does not need to carry the location information of transmission units to be scheduled, but only needs to carry the index identifier. The location information of transmission units to be scheduled is indexed by using the index identifier.

In step 504, the terminal receives the scheduling signaling, queries a transmission unit index table according to the index identifier, and determines the plurality of transmission units that are discontinuous in the time domain corresponding to the index identifier.

When receiving the scheduling signaling, the terminal obtains the index identifier therefrom, and queries the transmission unit index table according to the index identifier.

In a first possible implementation, the transmission unit index table includes location information of the plurality of transmission units that are discontinuous in the time domain corresponding to each index identifier, and the location information of the plurality of transmission units that are discontinuous in the time domain corresponding to the index identifier may be determined by querying the transmission unit index table according to the index identifier, and thus, the plurality of transmission units that are discontinuous in the time domain corresponding to the index identifier may be determined.

Based on the example in Table 1 above, when the index identifier in the scheduling signaling is 2, then it is determined that the location information of the plurality of corresponding transmission units is {start location 1, continuation length 1}; {start location 2. Continuation length 2}; {start location 3, continuation length 3}, so that the three scheduled transmission units may be determined according to the location information.

In a second possible implementation, the transmission unit index table includes a transmission unit configuration corresponding to each index identifier, the transmission unit configuration corresponding to the index identifier may be determined by querying the transmission unit index table according to the index identifier, and transmission units for which the scheduling identifier is a first identifier in the transmission unit configuration may be determined as scheduled transmission units, and thus the plurality of transmission units that are discontinuous in the time domain corresponding to the index identifier may be determined.

Based on the example in Table 2 above, when the index identifier in the scheduling signaling is 3, the corresponding transmission unit configuration is 11100001110000}, and the first symbol, the second symbol, the third symbol, the eighth symbol, the ninth symbol and the tenth symbol in the slot in which the scheduling signaling is located are determined as scheduled transmission units.

In step 505, the base station exchanges the data with the terminal through the plurality of transmission units.

It should be noted that these embodiments only describe a process for scheduling the plurality of transmission units that are discontinuous in the time domain. In practical applications, the plurality of transmission units that are continuous in the time domain may further be scheduled. Moreover, the base station may transmit a scheduling rule to the terminal. The scheduling rule is used to specify that in case that the plurality of transmission units that are continuous in the time domain have been scheduled, remaining plurality of transmission units are scheduled when the remaining plurality of transmission units are discontinuous in the time domain caused by occupied transmission units existing in the plurality of transmission units that are continuous in the time domain. The terminal stores the scheduling rule, and in a data exchanging process, the base station and the terminal determine transmission units to be scheduled according to the scheduling rule, that is, in a case where the plurality of transmission units that are continuous in the time domain have been scheduled, when occupied transmission units exist in the plurality of transmission units that are continuous in the time domain, resulting that the remaining plurality of transmission units are discontinuous in the time domain, the base station exchanges the data with the terminal through the remaining plurality of transmission units.

According to the method provided by the embodiment of the present disclosure, the base station transmits a scheduling signaling to the terminal, wherein the scheduling signaling includes the indication information for indicating the plurality of transmission units that are discontinuous in the time domain; the terminal receives the scheduling signaling and determines the scheduled plurality of transmission units that are discontinuous in the time domain according to the indication information; and the base station may exchange data with the terminal through the plurality of transmission units. Embodiments of the present disclosure provide a method for scheduling a plurality of transmission units that are discontinuous in the time domain, thereby breaking the limitation that only the plurality of transmission units that are continuous in the time domain can be scheduled, which improves flexibility, effectively supports a plurality of service types, and expands the service scope.

Moreover, the base station first transmits the transmission unit index table to the terminal, then the scheduling signaling transmitted by the base station to the terminal only needs to carry index identifier during each scheduling is carried out, without carrying the location information of the plurality of transmission units or transmission unit configuration. Accordingly, the data volume is reduced and the network resources are saved.

Figure 6:
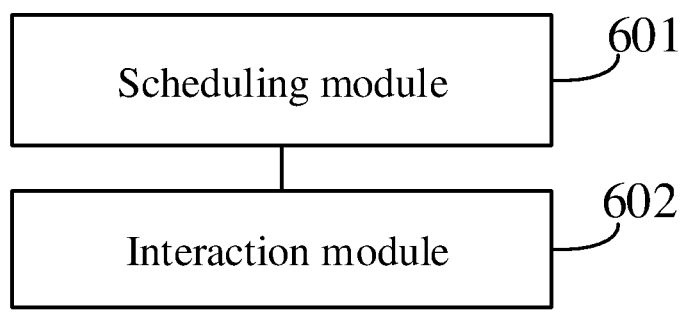
FIG. 6 is a block diagram showing a base station according to an exemplary embodiment.

FIG. 6 is a block diagram showing a base station according to an exemplary embodiment. With reference to FIG. 6, the base station includes a scheduling module 601 and an interaction module 602.

The scheduling module 601 is configured to transmit a scheduling signaling to a terminal, wherein the scheduling signaling includes indication information for indicating a plurality of transmission units that are discontinuous in a time domain, and the terminal is configured to receive the scheduling signaling and determine the plurality of transmission units that are discontinuous in the time domain according to the indication information.

The interaction module 602 is configured to exchange data with the terminal through the plurality of transmission units.

In a possible implementation, the indication information includes location information of the plurality of transmission units that are discontinuous in the time domain;
the location information of the transmission units includes start locations and end locations of the transmission units; or
the location information of the transmission units includes start locations and continuation lengths of the transmission units, and end locations of the transmission units are determined by the start locations and the continuation lengths of the transmission units.

In another possible implementation, the base station further includes:
a first transmission module configured to transmit a transmission unit index table to the terminal, wherein the transmission unit index table includes location information of the plurality of transmission units that are discontinuous in the time domain corresponding to each index identifier;
wherein the indication information is the index identifier, and the terminal is configured to receive the scheduling signaling, query the transmission unit index table according to the index identifier, and determine the location information of the plurality of transmission units that are discontinuous in the time domain corresponding to the index identifier.

In another possible implementation, the base station further includes:
a second transmission module configured to transmit a transmission unit index table to the terminal, wherein the transmission unit index table includes a transmission unit configuration corresponding to each index identifier, the transmission unit configuration includes a scheduling identifier for each transmission unit, the scheduling identifier is a first identifier indicating that a corresponding transmission unit is scheduled, or the scheduling identifier is a second identifier indicating that a corresponding transmission unit is not scheduled;
wherein the indication information is the index identifier, and the terminal is configured to receive the scheduling signaling, query the transmission unit index table according to the index identifier, determine a transmission unit configuration corresponding to the index identifier, and determine transmission units for which the scheduling identifier is the first identifier in the transmission unit configuration as scheduled transmission units.

In another possible implementation, the indication information is positioned in an information field at a fixed location of the scheduling signaling, and a bit length of the indication information is fixed or determined by configuration.

In another possible implementation, the scheduling module 601 is further configured to determine scheduled transmission units according to a scheduling rule; wherein the scheduling rule is configured to specify that in case that a plurality of transmission units that are continuous in a time domain have been scheduled, remaining plurality of transmission units are scheduled when the remaining plurality of transmission units are discontinuous in the time domain caused by occupied transmission units existing in the plurality of transmission units that are continuous in the time domain, and the terminal is configured to determine the scheduled transmission units according to the scheduling rule.

Figure 7:
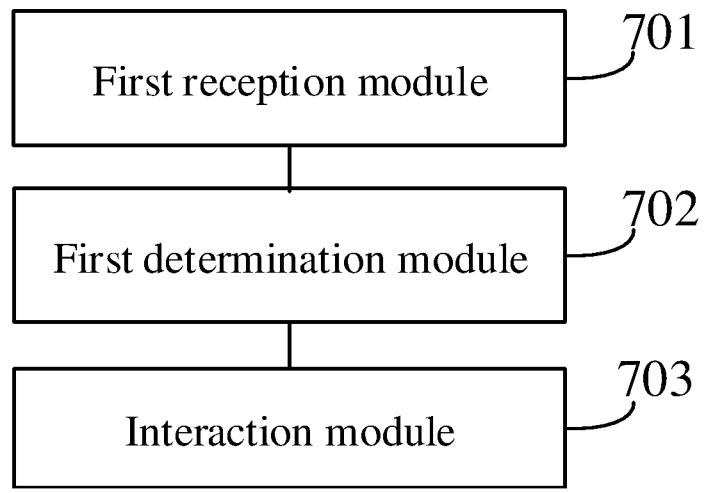
FIG. 7 is a block diagram showing a terminal according to an exemplary embodiment.

FIG. 7 is a block diagram showing a terminal according to an exemplary embodiment. With reference to FIG. 7, the terminal includes a first reception module 701, a first determination module 702 and an interaction module 703.

The first reception module 701 is configured to receive a scheduling signaling transmitted by a base station, wherein the scheduling signaling includes indication information for indicating a plurality of transmission units that are discontinuous in a time domain.

The first determination module 702 is configured to determine the plurality of transmission units that are discontinuous in the time domain according to the indication information.

The interaction module 703 is configured to exchange data with the base station through the plurality of transmission units.

In another possible implementation, the indication information includes location information of the plurality of transmission units that are discontinuous in the time domain;

the location information of the transmission units includes start locations and end locations of the transmission units; or the location information of the transmission units includes start locations and continuation lengths of the transmission units, and end locations of the transmission units are determined by the start locations and the continuation lengths of the transmission units.

In another possible implementation, the indication information is an index identifier, and the first determination module 702 is further configured to query a transmission unit index table according to the index identifier, and determine location information of the plurality of transmission units that are discontinuous in the time domain corresponding to the index identifier, wherein the transmission unit index table includes the location information of the plurality of transmission units that are discontinuous in the time domain corresponding to each index identifier.

In another possible implementation, the indication information is an index identifier, and the first determination module 702 is further configured to query a transmission unit index table according to the index identifier, determine a transmission unit configuration corresponding to the index identifier, and determine a transmission unit that a scheduling identifier is a first identifier in the transmission unit configuration as scheduled transmission units, wherein the transmission unit index table includes the transmission unit configuration corresponding to each index identifier, the transmission unit configuration includes the scheduling identifier for each transmission unit, the scheduling identifier is the first identifier indicating that a corresponding transmission unit is scheduled, or the scheduling identifier is a second identifier indicating that a corresponding transmission unit is not scheduled.

In another possible implementation, the indication information is positioned in an information field at a fixed location of the scheduling signaling, and a bit length of the indication information is fixed or determined by configuration.

In another possible implementation, the terminal further includes:

a second determination module configured to determine scheduled transmission units according to a scheduling rule; wherein the scheduling rule is configured to specify that in case that a plurality of transmission units that are continuous in a time domain have been scheduled, remaining plurality of transmission units are scheduled when the remaining plurality of transmission units are discontinuous in the time domain caused by occupied transmission units existing in the plurality of transmission units that are continuous in the time domain, and the base station is configured to determine the scheduled transmission units according to the scheduling rule.

It should be noted that during scheduling between the base station and the terminal provided in the above embodiments are exemplified only by taking the division of the above functional modules as an example. In practical applications, the above functions may be allocated by different functional modules as required, that is, internal structures of the terminal and the base station are divided into different functional modules to complete all or part of the functions described above. In addition, the base station and the terminal provided by the above embodiments belong to the same concept as the embodiment of the scheduling method, and specific implementation processes thereof are described in the method embodiments, and are not described herein again.

Figure 8:
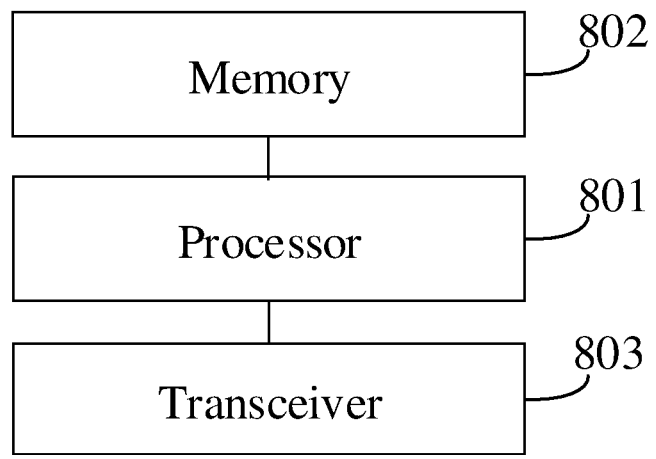
FIG. 8 is a block diagram showing a base station according to an exemplary embodiment.

FIG. 8 is a block diagram showing a base station according to an exemplary embodiment. With reference to FIG. 8, the base station includes a processor 801; a memory 802, which is configured to store processor-executable instructions; and a transceiver 803. Among them, the processor 801 is configured to:

transmit a scheduling signaling to a terminal by the transceiver 803, wherein the scheduling signaling includes indication information for indicating a plurality of transmission units that are discontinuous in a time domain, and the terminal is configured to receive the scheduling signaling and determine the plurality of transmission units that are discontinuous in the time domain according to the indication information; and exchange data with the terminal through the plurality of transmission units.

The embodiment of the present disclosure further discloses a computer-readable storage medium. An instruction in the computer-readable storage medium causes a base station to perform the scheduling method in the above embodiment when being executed by a processor of the base station.

Figure 9:
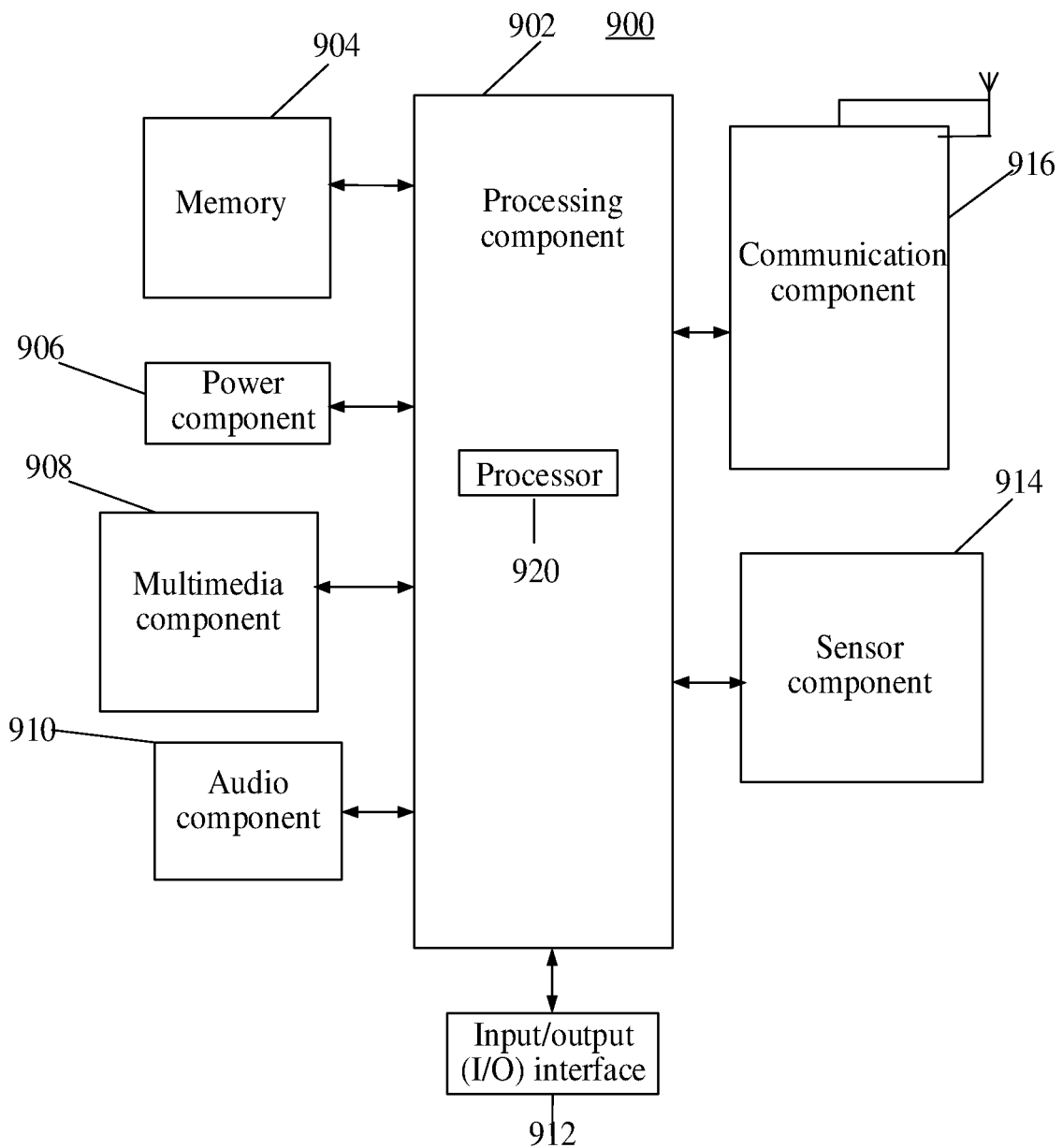
FIG. 9 is a block diagram showing a terminal according to an exemplary embodiment.

FIG. 9 is a block diagram showing a terminal 900 according to an exemplary embodiment. For example, the terminal 900 may be a mobile phone, a computer, a digital broadcasting apparatus, a messaging device, a game console, a tablet device, a medical device, a fitness device, a personal digital assistant, and the like.

Referring to FIG. 9, the apparatus 900 may include one or more of the following components: a processing component 902, a memory 904, a power component 906, a multimedia component 908, an audio component 910, an input/output (I/O) interface 912, a sensor component 914, and a communication component 916.

The processing component 902 typically controls the overall operations of the apparatus 900, such as the operations associated with display, telephone calls, data communications, camera operations, and recording operations. The processing component 902 may include one or more processors 920 to execute instructions to perform all or part of the steps in the above described methods. Moreover, the processing component 902 may include one or more modules which facilitate the interaction between the processing component 902 and other components. For instance, the processing component 902 may include a multimedia module to facilitate the interaction between the multimedia component 908 and the processing component 902.

The memory 904 is configured to store various types of data to support the operation of the apparatus 900. Examples of such data include instructions for any applications or methods operated on the apparatus 900, contact data, phonebook data, messages, pictures, videos, etc. The memory 904 may be implemented by using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 906 provides power to various components of the apparatus 900. The power component 906 may include a power management system, one or more power sources, and any other components associated with the generation, management, and distribution of power in the apparatus 900.

The multimedia component 908 includes a screen providing an output interface between the apparatus 900 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense the duration and pressure associated with the touch or swipe action. In some embodiments, the multimedia component 908 includes a front camera and/or a rear camera. The front camera and the rear camera may receive external multimedia data while the apparatus 900 is in an operation mode, such as a photographing mode or a video mode. Each of the front camera and the rear camera may be a fixed optical lens system or have focus and optical zoom capability.

The audio component 910 is configured to output and/or input audio signals. For example, the audio component 910 includes a microphone (MIC) configured to receive external audio signals when the apparatus 900 is in an operation mode, such as a call mode, a recording mode, and a voice recognition mode. The received audio signal may be further stored in the memory 904 or transmitted via the communication component 916. In some embodiments, the audio component 910 further includes a speaker for outputting audio signals.

The I/O interface 912 provides an interface between the processing component 902 and peripheral interface modules, such as a keyboard, a click wheel, buttons, and the like. The buttons may include, but are not limited to, a home button, a volume button, a start button, and a lock button.

The sensor component 914 includes one or more sensors to provide status assessments of various aspects of the apparatus 900. For instance, the sensor component 914 may detect an on/off status of the apparatus 900, relative positioning of components. e.g., the display device and the mini keyboard of the apparatus 900, and the sensor component 914 may also detect a position change of the apparatus 900 or a component of the apparatus 900, presence or absence of user contact with the apparatus 900, orientation or acceleration/deceleration of the apparatus 900, and temperature change of the apparatus 900. The sensor component 914 may include a proximity sensor configured to detect the presence of nearby objects without any physical contact. The sensor component 914 may also include a light sensor, such as a CMOS or CCD image sensor, used for imaging applications. In some embodiments, the sensor component 914 may also include an accelerometer sensor, a gyroscope sensor, a magnetic sensor, a pressure sensor, or a temperature sensor.

The communication component 916 is configured to facilitate communication, wired or wirelessly, between the apparatus 900 and other devices. The apparatus 900 can access a wireless network based on a communication standard, such as WiFi, 2G, or 3G, or a combination thereof. In an exemplary embodiment, the communication component 916 receives broadcast signals or broadcast associated information from an external broadcast management system via a broadcast channel. In an exemplary embodiment, the communication component 916 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the apparatus 900 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, a non-transitory computer-readable storage medium including instructions is also provided, such as the memory 904 including instructions, executable by the processor 920 in the apparatus 900, for performing the above-described methods. For example, the non-transitory computer-readable storage medium may be a ROM, a RAM, a CD-ROM, a magnetic tape, a floppy disc, an optical data storage device, and the like.

Further, there is provided a computer-readable storage medium. An instruction in the computer-readable storage medium causes a terminal to perform the method in the above embodiment when being executed by a processor of the terminal. The method includes:

receiving a scheduling signaling transmitted by the base station, wherein the scheduling signaling includes indication information for indicating a plurality of transmission units that are discontinuous in a time domain;

determining the plurality of transmission units that are discontinuous in the time domain according to the instruction information; and exchanging data with the base station through the plurality of transmission units.

Persons of ordinary skill in the art can understand that all or part of the steps described in the above embodiments can be completed through hardware, or through relevant hardware instructed by applications stored in a non-transitory computer readable storage medium, such as a read-only memory, a disk or a CD, etc.

The foregoing descriptions are merely optional embodiments of the present disclosure, and are not intended to limit the present disclosure. Within the spirit and principles of the disclosure, any modifications, equivalent substitutions, improvements, etc., are within the protection scope of the present disclosure.

The invention claimed is:

1. A scheduling method, performed by a base station, and comprising:
   determining scheduled transmission units according to a scheduling rule, wherein the scheduling rule is configured to specify: in response to that occupied transmission units exist in a plurality of scheduled transmission units that are continuous in a time domain such that remaining transmission units are discontinuous in the time domain, the remaining transmission units are scheduled, wherein the plurality of scheduled transmission units that are continuous in the time domain comprise the occupied transmission units and the remaining transmission units that are discontinuous in the time domain, and a terminal is configured to determine the scheduled transmission units according to the scheduling rule.

2. The method according to claim 1, further comprising:
   transmitting a scheduling signaling to the terminal, wherein the scheduling signaling comprises indication information for indicating a plurality of transmission units that are discontinuous in the time domain, and the terminal is configured to receive the scheduling signaling and determine the plurality of transmission units that are discontinuous in the time domain according to the indication information; and
   exchanging data with the terminal through the plurality of transmission units.

3. The method according to claim 2, wherein the indication information comprises location information of the plurality of transmission units that are discontinuous in the time domain;
   the location information of the transmission units comprises start locations and end locations of the transmission units; or
   the location information of the transmission units comprises start locations and continuation lengths of the transmission units, and end locations of the transmission units are determined by the start locations and the continuation lengths of the transmission units.

4. The method according to claim 1, further comprising:
   transmitting a transmission unit index table to the terminal, wherein the transmission unit index table comprises a transmission unit configuration corresponding to each index identifier, the transmission unit configuration comprises a scheduling identifier for each transmission unit, the scheduling identifier is a first identifier indicating that a corresponding transmission unit is scheduled, or the scheduling identifier is a second identifier indicating that a corresponding transmission unit is not scheduled;
   wherein the indication information is an index identifier, and the terminal is configured to receive the scheduling signaling, query the transmission unit index table according to the index identifier, determine the transmission unit configuration corresponding to the index identifier, and determine transmission units for which the scheduling identifier is the first identifier in the transmission unit configuration as scheduled transmission units.

5. The method according to claim 2, wherein the indication information is positioned in an information field at a fixed location of the scheduling signaling, and a bit length of the indication information is fixed or determined by configuration.

6. A scheduling method, performed by a terminal, and comprising:
   determining scheduled transmission units according to a scheduling rule, wherein the scheduling rule is configured to specify: in response to that occupied transmission units exist in a plurality of scheduled transmission units that are continuous in a time domain such that remaining transmission units are discontinuous in the time domain, the remaining transmission units are scheduled, wherein the plurality of scheduled transmission units that are continuous in the time domain comprise the occupied transmission units and the remaining transmission units that are discontinuous in the time domain, and a base station is configured to determine the scheduled transmission units according to the scheduling rule.

7. The method according to claim 6, further comprising:
   receiving a scheduling signaling transmitted by the base station, wherein the scheduling signaling comprises indication information for indicating a plurality of transmission units that are discontinuous in the time domain;
   determining the plurality of transmission units that are discontinuous in the time domain according to the indication information; and
   exchanging data with the base station through the plurality of transmission units.

8. The method according to claim 7, wherein the indication information comprises location information of the plurality of transmission units that are discontinuous in the time domain;
   the location information of the transmission units comprises start locations and end locations of the transmission units; or
   the location information of the transmission units comprises start locations and continuation lengths of the transmission units, and end locations of the transmission units are determined by the start locations and the continuation lengths of the transmission units.

9. The method according to claim 7, wherein the indication information is an index identifier, and the determining the plurality of transmission units that are discontinuous in the time domain according to the indication information comprises:
   querying a transmission unit index table according to the index identifier, determining a transmission unit configuration corresponding to the index identifier, and determining transmission units for which a scheduling identifier is a first identifier in the transmission unit configuration as scheduled transmission units, wherein the transmission unit index table comprises the transmission unit configuration corresponding to each index identifier, the transmission unit configuration comprises the scheduling identifier for each transmission unit, the scheduling identifier is the first identifier indicating that a corresponding transmission unit is scheduled, or the scheduling identifier is a second identifier indicating that a corresponding transmission unit is not scheduled.

10. The method according to claim 7, wherein the indication information is positioned in an information field at a fixed location of the scheduling signaling, and a bit length of the indication information is fixed or determined by configuration.

11. A base station, comprising:

a processor; and a memory storing instructions executable by the processor;

wherein the processor is configured to:

determine scheduled transmission units according to a scheduling rule, wherein the scheduling rule is configured to specify: in response to that occupied transmission units exist in a plurality of scheduled transmission units that are continuous in a time domain such that remaining plurality of transmission units are discontinuous in the time domain, the remaining transmission units are scheduled, wherein the plurality of scheduled transmission units that are continuous in the time domain comprise the occupied transmission units and the remaining transmission units that are discontinuous in the time domain, and a terminal is configured to determine the scheduled transmission units according to the scheduling rule.

12. The base station according to claim 11, wherein the processor is further configured to:

transmit a scheduling signaling to the terminal, wherein the scheduling signaling comprises indication information for indicating a plurality of transmission units that are discontinuous in the time domain, and the terminal is configured to receive the scheduling signaling and determine the plurality of transmission units that are discontinuous in the time domain according to the indication information; and exchange data with the terminal through the plurality of transmission units.

13. The base station according to claim 12, wherein the indication information comprises location information of the plurality of transmission units that are discontinuous in the time domain;

the location information of the transmission units comprises start locations and end locations of the transmission units; or the location information of the transmission units comprises start locations and continuation lengths of the transmission units, and end locations of the transmission units are determined by the start locations and the continuation lengths of the transmission units.

14. The base station according to claim 12, wherein the processor is further configured to:

transmit a transmission unit index table to the terminal, wherein the transmission unit index table comprises a transmission unit configuration corresponding to each index identifier, the transmission unit configuration comprises a scheduling identifier for each transmission unit, the scheduling identifier is a first identifier indicating that a corresponding transmission unit is scheduled, or the scheduling identifier is a second identifier indicating that a corresponding transmission unit is not scheduled;

wherein the indication information is an index identifier, and the terminal is configured to receive the scheduling signaling, query the transmission unit index table according to the index identifier, determine a transmission unit configuration corresponding to the index identifier, and determine transmission units for which the scheduling identifier is the first identifier in the transmission unit configuration as scheduled transmission units.

15. The method according to claim 12, wherein the indication information is positioned in an information field at a fixed location of the scheduling signaling, and a bit length of the indication information is fixed or determined by configuration.

* * * * *